United States Patent [19]

Nakayama

[11] Patent Number: 5,425,336
[45] Date of Patent: Jun. 20, 1995

[54] OUTBOARD MOTOR

[75] Inventor: Manabu Nakayama, Hamamatsu, Japan

[73] Assignee: Sanshin Kogyo Kabushiki Kaisha, Hamamatsu, Japan

[21] Appl. No.: 180,900

[22] Filed: Jan. 13, 1994

[30] Foreign Application Priority Data

Jan. 14, 1993 [JP] Japan .................................. 5-022071

[51] Int. Cl.6 ............................................. F02B 77/00
[52] U.S. Cl. ............................ 123/198 R; 123/195 A; 123/195 P; 474/133
[58] Field of Search ........... 123/198 R, 195 A, 195 P; 474/133, 136

[56] References Cited

U.S. PATENT DOCUMENTS

| | | | |
|---|---|---|---|
| 2,320,295 | 5/1943 | Patterson | 474/136 |
| 4,583,961 | 4/1986 | Kawasawa et al. | 474/133 |
| 4,618,336 | 10/1986 | Isobe et al. | 474/133 |

FOREIGN PATENT DOCUMENTS

| | | | |
|---|---|---|---|
| 67428 | 3/1990 | Japan | 123/198 R |
| 3157295 | 7/1991 | Japan . | |
| 23715 | of 1893 | United Kingdom | 474/136 |

Primary Examiner—Noah P. Kamen
Attorney, Agent, or Firm—Knobbe, Martens, Olson & Bear

[57] ABSTRACT

Two embodiments of flexible transmitter tensioning devices that afford a screw threaded operation for moving an idler pulley to vary the adjustments. The construction lends itself to incorporation in an outboard motor.

5 Claims, 4 Drawing Sheets

OUTBOARD MOTOR

BACKGROUND OF THE INVENTION

This invention relates to an outboard motor and more particularly to an improved arrangement for tightening the flexible transmitter of a drive for an accessory of the engine of an outboard motor.

Frequently the internal combustion engine of an outboard motor drives one or more accessories. These accessories may include devices such as alternators or generators, air pumps, high pressure fuel pumps and various other types of devices employed either for the engine or the associated watercraft and for their operation. Normally these devices are driven by a flexible transmitter such as a drive belt that is disposed at the upper surface of the outboard motor within the protective cowling of the powerhead. Also, as is well known, the construction of outboard motors and particularly their powerheads is extremely compact in an effort to maintain a small sizes. However, this compact construction make servicing difficult in many instances.

It is necessary not only during initial installation but from time to time to ensure that the flexible transmitters that drive the various accessories are under the proper tension. Many of these flexible transmitters tend to elongate during periods of long use and, therefore, it is desirable if not necessary to check the tension and adjust it after certain periods of running.

Conventionally, the way in which such accessory drive flexible transmitters are adjusted is to mount one of the driven elements for pivotal movement about an axis. When this element is released and pivoted, then the tension on the flexible transmitter can be adjusted. There are, however, a number of disadvantages with such an arrangement.

First, with many types of flexible transmitters it is necessary to actually measure the tension in the drive belt in some manner in order to appropriately set it. It is difficult for an operator to both measure the tension and lock the tension adjusting device in place at the same time. This is particularly true when attempts are being made to adjust the flexible transmitter when the outboard motor is attached to the transom of an associate watercraft.

Also, in order to provide sufficient tension, it is frequently necessary to utilize some form of leverage system whereby the pivoted number can be moved. The insertion of screwdrivers or other tools for levering the accessory to tension the belt can cause damage to the components. In addition, this also is an awkward operation to perform, particularly when the outboard motor is attached to the transom of the watercraft.

It is, therefore, a principal object of this invention to provide an improved arrangement for tensioning the flexible transmitter that drives an accessory of an outboard motor.

It is a further object of this invention to provide an improved arrangement for adjusting the tension in a flexible transmitter drive.

SUMMARY OF THE INVENTION

This invention is adapted to be embodied in a transmitter tensioning device for a flexible transmitter of an outboard motor that is comprised of an engine having an output shaft and a surrounding protective cowling. At least one engine auxiliary has a pulley for driving an input shaft thereof. A pulley driven drives the accessory pulley through a flexible transmitter which is trained around the pulleys. At least one of the pulleys is moveable along a path defined by a support plate and an adjusting screw rotatable about an axis extending transversely to the axis has a threaded connection to the supporting plate for moving the supporting plate along the adjusting screw axis upon rotation of the adjusting screw for adjusting the tension of the flexible transmitter.

DETAILED DESCRIPTION OF THE PREFERRED EMBODIMENT OF THE INVENTION

Figure 1:
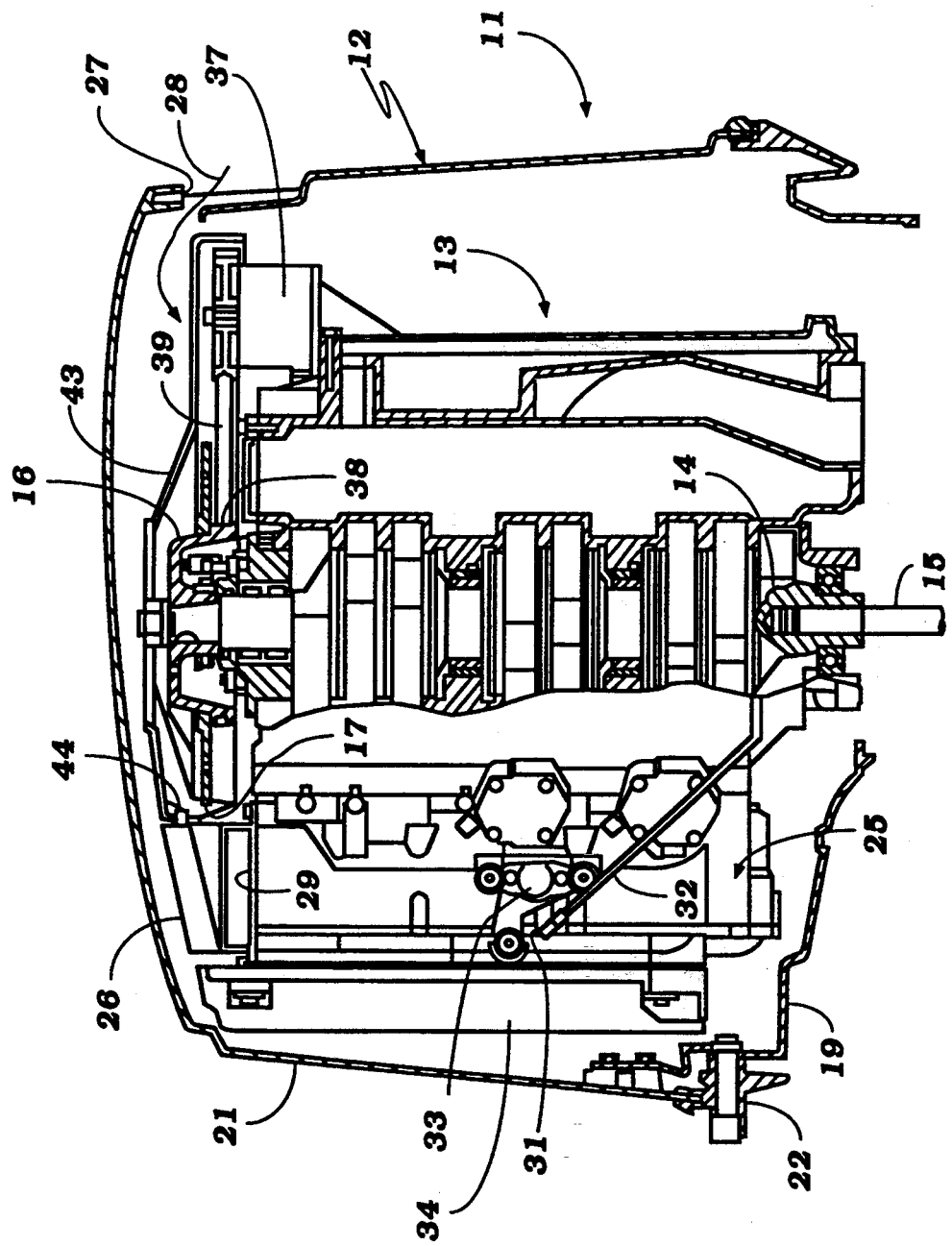
FIG. 1 is a partial side elevational view of the upper portion of an outboard motor constructed in accordance with an embodiment of the invention, with portions broken away and other portions shown in section.
Figure 2:
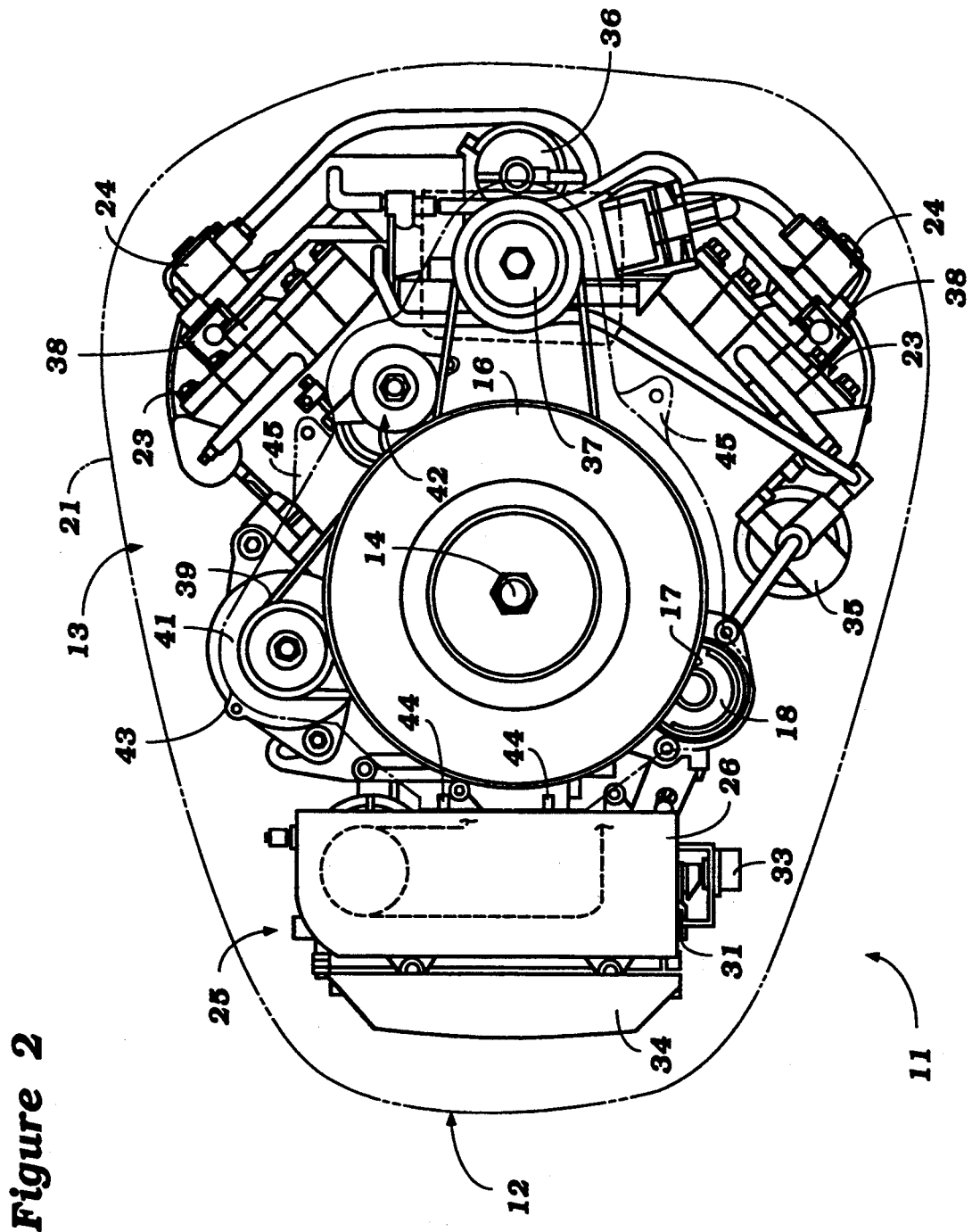
FIG. 2 is a top plan view of the outboard motor with the protective cowling shown in phantom.

Referring now in detail to the drawings and initially to FIGS. 1 and 2, a portion of an outboard motor is illustrated and is identified generally by the reference numeral 11. The only portion of the outboard motor 11 which is illustrated is the powerhead, indicated generally by the reference numeral 12 because the invention deals primarily with the powerhead and specifically the accessory drive contained therein.

The powerhead 12 is comprised of an internal combustion engine, indicated generally by the reference numeral 13 and which in the illustrated embodiment is depicted as being of the V6, two-cycle, crankcase compression type. Although the invention is described in conjunction with such an engine, it will be readily apparent to those skilled in the are how the invention can be employed with engines having other cylinder numbers, other configurations and engines that operate on the four stroke principle rather than a two stroke principle. In addition, the invention may be employed in conjunction with rotary type engines of any known type.

As is typical with outboard motor practice, the engine 13 is positioned in the powerhead so that its crankshaft 14 rotates about a vertically extending axis. As is well known, the crankshaft 14 is coupled to a driveshaft 15 that depends into a driveshaft housing and lower unit (not shown) that depends from the powerhead 12 and which contains a propulsion device for propelling an associated watercraft. A mechanism is associated with the driveshaft housing for detachably connecting the outboard motor 11 to a transom of an associated watercraft. All these portions of the construction may be considered to be conventional and, for that reason, further description of them is not believed to be necessary to enable those skilled in the art to practice the invention.

A flywheel assembly 16 is affixed to the upper end of the crankshaft 14 and carries a starter gear 17 which cooperates with a starter 18 that is affixed to the cylinder block of the engine in a known manner for electrical starting of the engine 13. In addition, the flywheel assembly 16 has a pulley portion for driving accessories, as will be described.

The powerhead 12 is completed by a protective cowling which is comprised of a lower tray 19 that is affixed to the upper end of the aforenoted driveshaft housing in a well known manner. A main cowling portion 21 is detachably connected to the tray 19 in a known manner that includes a latch mechanism 22 so that the main cowling portion 21 may be readily removed for servicing purposes.

In the illustrated embodiment the engine 13 has been depicted as being of the V6 crankcase compression two-cycle internal combustion engine type. Although the invention has particular utility with such engines, it will be readily apparent to those skilled in the art that the invention can be practiced and utilized with a wide variety of types of engines. For that reason, full details of the construction of the engine 13 are not believed to be necessary so as to permit those skilled in the art to practice the invention. However, certain portions of the structure of the engine will be described so as to permit greater understanding of the invention and also so that those skilled in the art can understand how the invention can be utilized.

The engine 13 is comprised of a cylinder block that defines a pair of cylinder banks to which cylinder heads 23 are affixed in any well known manner. In the illustrated embodiment, the engine 13 is of the fuel injected type and fuel injectors 24 are mounted in the cylinder heads 23 and serve each of the combustion chambers thereof. The fuel injectors 24 in the illustrated embodiment are of the air fuel type and hence this requires the provision of the supply of both high pressure fuel and high pressure air to the injectors 24, in a manner which will be generally described.

As is well known in two-cycle engines, the crankshaft 14 rotates in a crankcase chamber with the crankcase chambers associated with each of the cylinders being sealed from each other in a well known manner. An air charge is delivered to these crankcase chambers through an induction system, indicated generally by the reference numeral 25 which includes an air inlet and silencing device 26 that draws atmospheric air from within the protective cowling of the powerhead 12.

Atmospheric air is admitted to the protective cowling through a rearwardly facing air inlet opening 27 which is formed in the main cowling portion 21 with the air flow being indicated by the arrow 28 in FIG. 1. This air is then silenced in the air inlet device 26 and is delivered to a throttle body mechanism 29 in which flow controlling throttle valves are provided for controlling the speed of the engine in a well known manner. This throttle body includes a throttle lever 31 that is actuated by a throttle control 32 which is remotely operated in any well known manner. A throttle position sensor 33 is mounted on the side of the throttle body 29 and provides an output signal indicative of the throttle valve position for control of the various accessories for the engine such as the fuel injectors 24 in any well known manner.

A protective cover 34 is affixed to the forward end of the throttle body 29 and is disposed closely adjacent the forward portion of the main cowling number 21.

As has been noted, the fuel air injectors 24 are supplied with fuel under pressure from a fuel supply system. This includes a vapor separator 35 that is mounted on one side of one of the cylinder banks and which receives fuel from a low pressure pump (not shown) that delivers the fuel from a remote source. This fuel is then delivered to a high pressure pump 36 and from the high pressure pump 36 to the fuel injectors 24.

High pressure air is supplied to the fuel injectors 24 from an air pump 37 which is mounted in the valley between the cylinder banks and which is driven in a manner to be described. The air pressure and fuel pressure are regulated by regulators 38 that are affixed to the cylinder heads 23 in proximity to air fuel injectors 24 in a well known manner. The air pump 37 is driven by the crankshaft 14 and specifically by a pulley 38 formed integrally thereon which drives a drive belt 39. The drive belt 39 in addition drives a number of additional accessories such as an alternator or generator 41. In order to maintain appropriate tension in the drive belt 39 a tensioner mechanism, indicated generally by the reference numeral 42 is provided which adjust the tension of the drive belt 39 in a manner which will be described.

A cowling or cover 43 is affixed over the drive belt 39 and other of the accessories at the top of the engine to protect it from the contact of any water which may enter the protective cowling through the air inlet opening 27. A pair of locating tabs 44 are formed on the air inlet device 26 for locating the cover 43.

Figure 3:
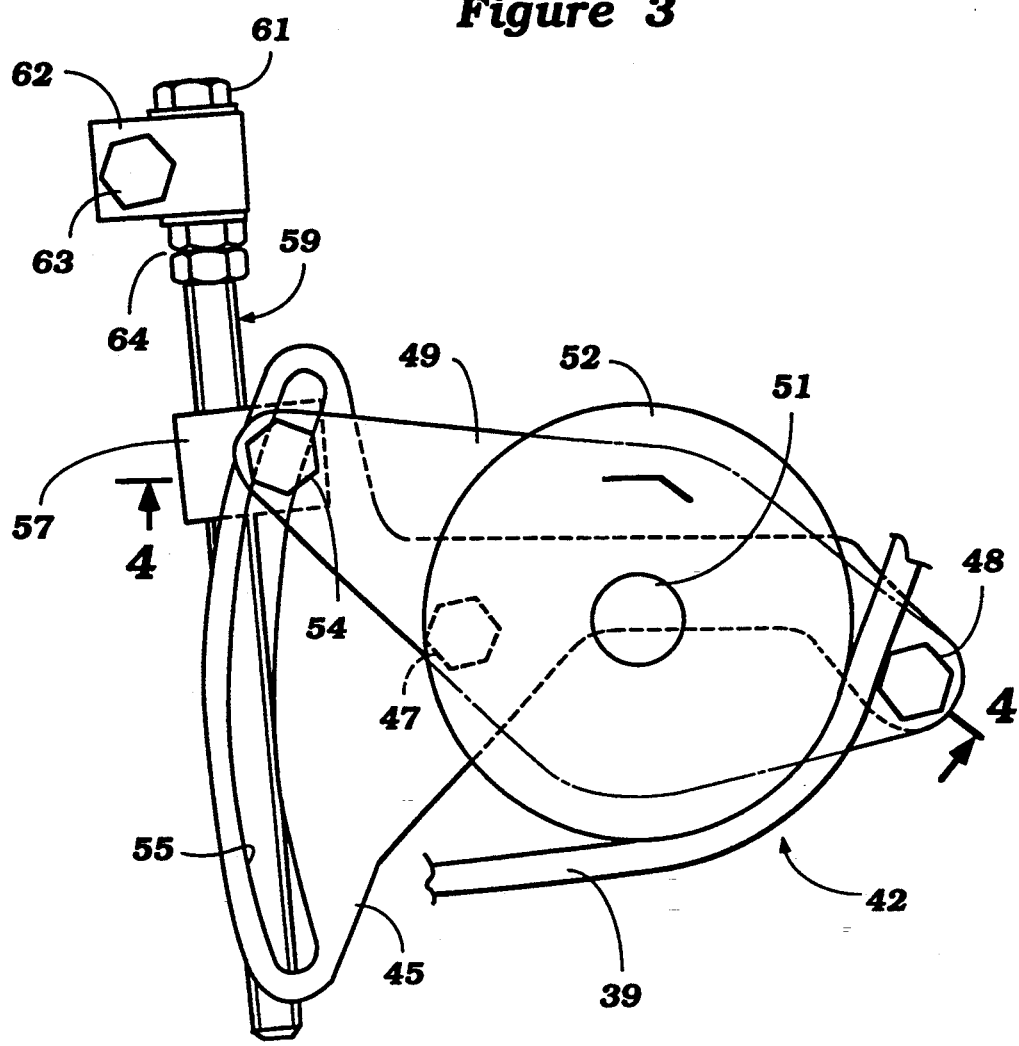
FIG. 3 is an enlarged top plan view of the belt tensioner adjusting mechanism of this embodiment.
Figure 4:
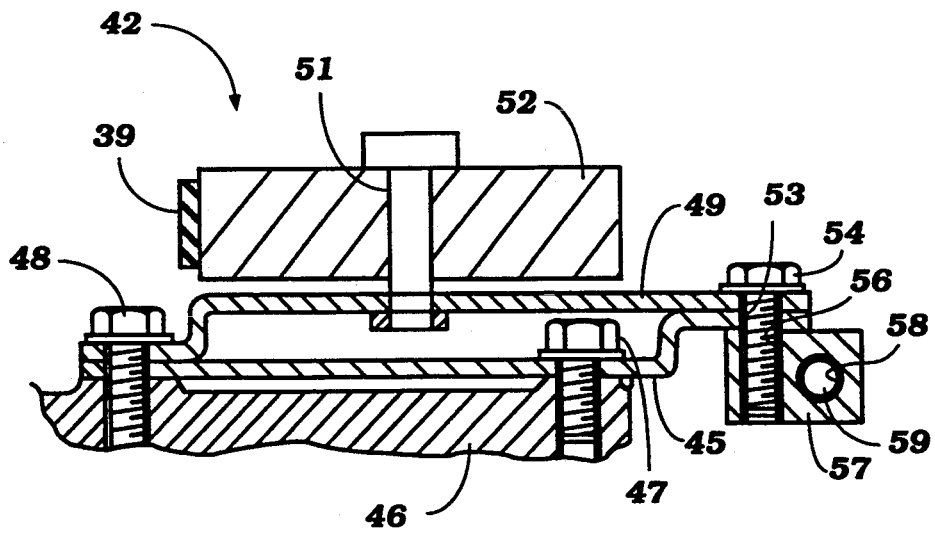
FIG. 4 is a cross-sectional view taken along the line 4—4 of FIG. 3.

One embodiment of tensioner mechanism 42 will now be described by particular reference to FIGS. 3 and 4. This tensioner mechanism 42 is comprised of a mounting bracket 45 that is affixed to the cylinder block of the engine 13, which cylinder block appears partially in FIG. 4 and is identified by the reference numeral 46. The mounting bracket 45 is positioned adjacent one of the cylinder banks and in the illustrated embodiment this is the left hand cylinder bank as viewed in FIG. 2. However, it is to be understood that the tensioner mechanism and mounting bracket 45 may be mounted adjacent the other cylinder bank and such an alternative location is showed in phantom lines in FIG. 2.

The bracket 45 is held to the cylinder block 46 by a first threaded fastener 47 which is torqued in place and remains fixed in this position. A further selectively tightenable threaded fastener 48 is also threaded into the cylinder block 46 and serves to hold the mounting bracket 45 in place. The threaded fastener 48 in addition is received in a complimentary opening formed in an idler support plate 49 so as to provide a pivotal support for the idle support plate 49 about the pivot axis defined by the threaded fastener 48. The idle support plate 49 has affixed to it a shaft 51 on which an idler pulley 52 is rotatably journalled.

The idler pulley 52 engages the drive belt 39 and thus is capable of adjusting the tension in the drive belt 39 upon effecting of pivotal movement of the idler support plate 49 relative to the mounting bracket 45. In order to facilitate this adjustment and to permit the operator to easily set the desired tension on the drive belt 39 and also to achieve this without requiring any leverage against any component of the outboard motor, the outer end of the idler support plate 49 is provided with a cylindrical bore 53 through which a threaded fastener 54 extends. This threaded fastener 54 has a portion that is received in an arcuate slot 55 formed on the mounting bracket 45. The arcuate slot 55 has a radius of curvature generated from the center of the fastener 48 which provides the pivotal support for the idler support plate 49.

The threaded fastener 54 is also threaded into a threaded opening 56 of an adjusting element 57. The adjusting element 57 is formed with a further threaded opening 58 which extends transversely to the threaded opening 56 and also transversely to the rotational axis of the idler pulley 52 defined by the shaft 51. A screw type tensioning adjustment element, indicated generally by the reference numeral 59 has a male threaded portion that is received in the threaded opening 58 of the adjusting element 57. This adjusting element 59 has a headed portion 61 which is formed adjacent a bore that is journalled in a clamp 62, which may be of the split type and which is not only tensioned by a fastener 63 but is also pivotally affixed by the fastener 63 to a suitable portion of the engine, such as the cylinder block 46. A jam nut 64 is positioned on the opposite side of the member 62 so as to lock the adjusting element 59 in position.

In order to adjust the tension of the drive belt 39 or to permit its removal and subsequent tensioning, the fasteners 48, 54, jam nut 64 and fastener 63, are loosened. The adjusting element 59 may then be freely rotated and its rotation will cause the adjusting member 57 to move along its axis. When this occurs, the bolt 54 will traverse the slot 55 and rotate the idler pulley 52 in either a clockwise or counter-clockwise direction. The member 62 will pivot slightly around the fastener 63 so as to accommodate this movement.

It should be noted that the radius of the slot 55 is relatively great and hence not a great deal of pivotal movement of the member 62 and adjusting element 59 as required. The operator may also determine the tension in the drive belt 39 if a torque wrench is employed for a rotating the headed portion 61 of the adjusting element 59. Once the desired tension is achieved, then the fasteners 73, 54 and 48 are again tightened into position as are the jam nut 64. Hence, it should be readily apparent that this embodiment is very effective in permitting adjustment of the drive tension on a drive belt and can be conveniently done within the confines of the powerhead 12 of the outboard motor 11. Of course, the protective cowling main portion 21 must be removed to permit this adjustment to be made.

Figure 5:
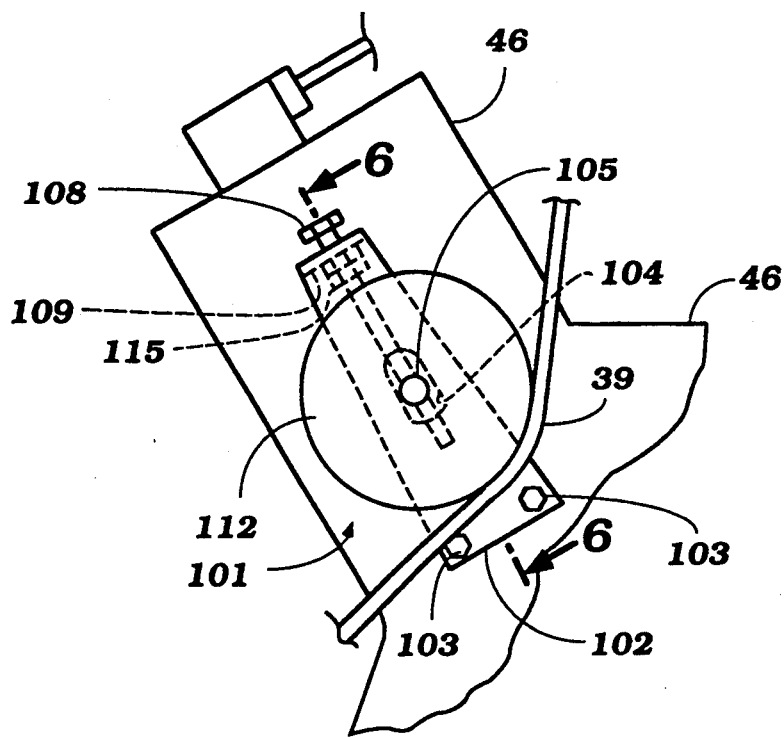
FIG. 5 is a top plan view, in part similar to FIG. 3 and shows another embodiment of the invention.
Figure 6:
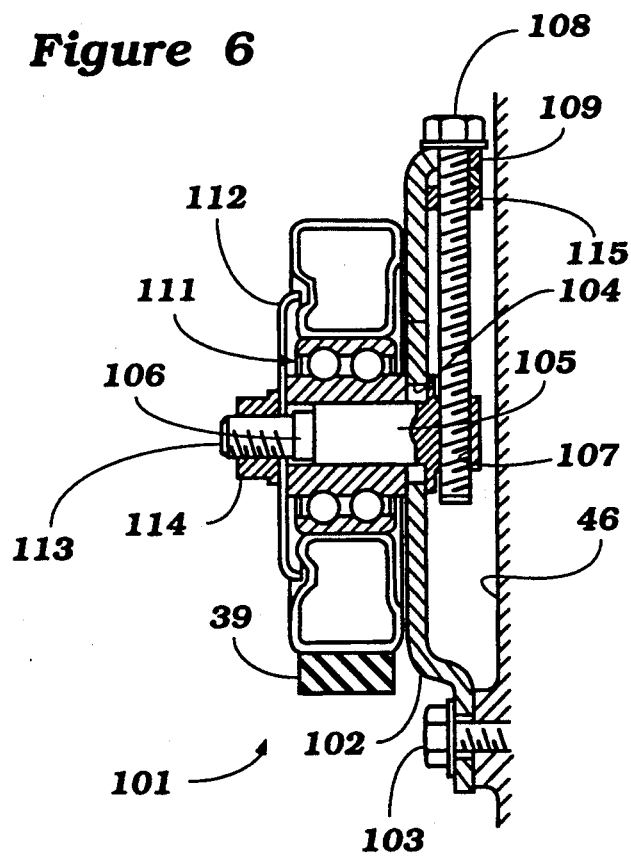
FIG. 6 is a cross-sectional view taken along the line 6—6 of FIG. 5 and on an enlarged scale.

Another embodiment of tensioner for the drive belt 39 is depicted in FIGS. 5 and 6 and is identified generally by the reference numeral 101. This embodiment also includes a mounting bracket 102 that is affixed to the engine in any suitable manner, preferably to one of the banks of the cylinder block 46 by threaded fasteners 103. The mounting bracket 102 is formed with an elongated slot 104 through which a post portion 105 of an adjusting support plate 106 passes. The adjusting support plate 106 has a threaded opening 107 that is threaded onto an adjusting screw 108 which, in turn, is journalled on an interned tang 109 formed at the outer peripheral edge of the mounting bracket 102. Rotation of the adjusting screw 108 will cause the post 105 to traverse the slot 104.

Mounted on the post 105 is an anti-friction bearing 111 which journals an idler pulley 112 that is engaged with the drive belt 39. The post 105 has a threaded end 113 on which a nut 114 is retained so as to hold the idler pulley 112 in position axially.

In order to remove the drive belt 39 or adjust its tension, a jam nut 115 is released so that the adjusting screw 108 may be easily turned. This will cause the post 105 to traverse the slot 104 and change the tension on the drive belt 39. Like the previously described embodiment, the actual tension on the drive belt may be measured by measuring the torque required to turn the adjusting screw 108. Once the desired tension is achieved, the jam nut 115 is again locked in position so that the adjusting screw 108 cannot rotate and the post 105 cannot move.

In the embodiments of the invention described the tensioners have been employed for adjusting the tension in a drive belt. Obviously the structure can be employed in conjunction with tensioning other types of flexible transmitters such as toothed belts, chains or the like. Also, the embodiments of the invention described are only preferred embodiments of the invention and various changes in modifications may be made without departing from the spirit and scope of the invention, as defined by the appended claims.

I claim:

1. A transmitter tensioning device for a flexible transmitter of an outboard motor comprising an engine having an output shaft and a surrounding protective cowling, at least one engine auxiliary having a pulley for driving an input shaft thereof, a pulley rotatably about an axis and a flexible transmitter trained around said pulleys for transmitting a driving force there between, at least one of said pulleys being journaled for rotation about a first axis upon a support plate, said support plate being supported for pivotal movement about a second axis parallel to but offset from said first axis, an adjusting screw rotatable about an adjusting axis extending transversely to said first and second axes, said adjusting screw being rotatable in a split clamp pivotal about a third axis parallel to said first and said second axes and offset therefrom, said third axis being defined in part by a locking bolt for locking said split clamp and a threaded connection between said adjusting screw and said support plate including a curved slot in said support plate having its center on said first axis for moving said support plate and said pulley axis upon rotation of said adjusting screw for adjusting the tension of said flexible transmitter.

2. A transmitter tensioning device for a flexible transmitter of an outboard motor as set forth claim 1, wherein the threaded connection between the adjusting screw and the support plate comprises a nut engaged with the adjusting screw and carrying a pin received in the slot in the support plate.

3. A transmitter tensioning device for a flexible transmitter of an outboard motor as set forth in claim 2, wherein the pulley driven by the engine comprises an idler pulley and further including an engine driven pulley for driving the drive belt and the idler pulley.

4. A transmitter tensioning device for a flexible transmitter of an outboard motor comprising an engine having an output shaft and a surrounding protective cowling, at least one engine auxiliary having a pulley for driving an input shaft thereof, a pulley rotatably about an axis and a flexible transmitter trained around said pulleys for transmitting a driving force there between, at least one of said pulleys being moveable in a path defined by a support plate fixed to the engine and defining a rectilinear path for said one pulley, and adjusting screw rotatable about an adjusting axis extending directly parallel to said slot, and a threaded connection directly between said adjusting screw and a post defining said one pulley axis upon rotation of said adjusting screw for rectilinear movement of said one pulley for adjusting the tension of said flexible transmitter.

5. A transmitter tensioning device for a flexible transmitter of an outboard motor as set forth in claim 4, wherein the pulley driven by the engine comprises an idler pulley and further including an engine driven pulley for driving the drive belt and the idler pulley.

* * * * *